US011281170B2

(12) United States Patent
Jones et al.

(10) Patent No.: US 11,281,170 B2
(45) Date of Patent: Mar. 22, 2022

(54) MULTI-POINT SYNCHRONIZABLE AND SCALABLE LIGHTING CONTROL SYSTEMS

(71) Applicant: JONES AND MALTERER TECHNOLOGY INNOVATIONS INCORPORATED, St. Charles, MO (US)

(72) Inventors: Dave Jones, St. Charles, MO (US); Nigel Malterer, St. Charles, MO (US)

(73) Assignee: JONES AND MALTERER TECHNOLOGY INNOVATIONS INCORPORATED, St. Charles, MO (US)

( * ) Notice: Subject to any disclaimer, the term of this patent is extended or adjusted under 35 U.S.C. 154(b) by 0 days.

(21) Appl. No.: 16/067,513

(22) PCT Filed: Dec. 28, 2016

(86) PCT No.: PCT/US2016/068911
§ 371 (c)(1),
(2) Date: Jun. 29, 2018

(87) PCT Pub. No.: WO2017/117240
PCT Pub. Date: Jul. 6, 2017

(65) Prior Publication Data
US 2019/0014635 A1    Jan. 10, 2019

Related U.S. Application Data

(60) Provisional application No. 62/272,567, filed on Dec. 29, 2015.

(51) Int. Cl.
*H04W 4/80* (2018.01)
*G05B 15/02* (2006.01)
(Continued)

(52) U.S. Cl.
CPC ............ *G05B 15/02* (2013.01); *G08C 17/02* (2013.01); *H04L 12/2816* (2013.01);
(Continued)

(58) Field of Classification Search
CPC ............ H05B 37/0272; H05B 33/0842; H05B 33/0845; H05B 33/0857
(Continued)

(56) References Cited

U.S. PATENT DOCUMENTS

2007/0208841 A1    9/2007    Barone et al.
2009/0278479 A1    11/2009   Platner
(Continued)

OTHER PUBLICATIONS

International Search Report for PCT/US2016/068911 dated May 8, 2017.

*Primary Examiner* — Minh D A
(74) *Attorney, Agent, or Firm* — Sandberg Phoenix and von Gontard

(57) ABSTRACT

A system, particularly adaptable for lighting and music presentations, such as for mood, ambience, or party settings includes a flat, wireless broadcast multi-point, synchronizable and scalable operation. The system includes a control system having an electronic circuit which includes a wireless mesh radio, a microcontroller, a wireless short-range radio link unit, a plurality of field-effect transistor (FET) drivers to connect to one or more individual light or sound producing devices or sets thereof, a low voltage DC power supply, an audio input rectifier and filter, and a rotary switch. The system is set up such that a plurality of these control systems are interconnected in a non-hierarchical mesh network, wherein the mesh wireless radio of a given control system has the capacity to signal other nearby control systems.

6 Claims, 2 Drawing Sheets

(51) Int. Cl.
  *G08C 17/02* (2006.01)
  *H04W 4/00* (2018.01)
  *H04W 4/021* (2018.01)
  *H04L 12/28* (2006.01)
  *H05B 45/20* (2020.01)
  *H05B 47/12* (2020.01)
  *H05B 47/19* (2020.01)
  *H05B 47/175* (2020.01)
  *H04W 84/18* (2009.01)

(52) U.S. Cl.
  CPC .............. *H04W 4/00* (2013.01); *H04W 4/021* (2013.01); *H04W 4/80* (2018.02); *H05B 45/20* (2020.01); *H05B 47/12* (2020.01); *H05B 47/175* (2020.01); *H05B 47/19* (2020.01); *G08C 2201/93* (2013.01); *H04L 2012/2841* (2013.01); *H04W 84/18* (2013.01)

(58) Field of Classification Search
  USPC .................................................. 315/292, 293
  See application file for complete search history.

(56) References Cited

U.S. PATENT DOCUMENTS

| | | | |
|---|---|---|---|
| 2011/0133655 A1* | 6/2011 | Recker | H02H 3/08 |
| | | | 315/159 |
| 2012/0218101 A1 | 8/2012 | Ford | |
| 2013/0063042 A1* | 3/2013 | Bora | H05B 47/16 |
| | | | 315/292 |
| 2013/0169186 A1 | 7/2013 | Steiner | |
| 2015/0102731 A1 | 4/2015 | Altamura et al. | |
| 2015/0168931 A1 | 6/2015 | Jin | |
| 2018/0352636 A1* | 12/2018 | Engelen | H05B 33/0863 |

* cited by examiner

MULTI-POINT SYNCHRONIZABLE AND SCALABLE LIGHTING CONTROL SYSTEMS

CROSS-REFERENCE TO RELATED APPLICATIONS

This application is the U.S. National Stage application under 35 U.S.C. § 371 of PCT/US2016/068911, filed Dec. 28, 2016, which claims the benefit of U.S. provisional application No. 62/272,567 filed Dec. 29, 2015. The above application is incorporated herein by reference.

STATEMENT REGARDING FEDERALLY SPONSORED RESEARCH OR DEVELOPMENT

Not applicable.

BACKGROUND OF THE INVENTION

The subject matter described herein relates generally to light and sound control systems, and more particularly, to a multi-point, synchronizable and scalable system not dependent on the internet, a gateway hub, or master coordinator for operation.

Light and sound systems, such as those conventionally available, require the use of multiple switches or additional wiring to control multiple lights and/or sound units. This requires installation of more wiring, professional installation (at added cost) services, and compliance with building codes. Such conventional systems also suffer from such systemic limitations as a reduced area of coverage between switch controlling lights in any given area.

Even smart, wireless lighting and/or sound systems which are currently available require the use of a coordinator hub device, such as a WiFi hub. This involves setup and use constraints and complications. For example, as to setup, use of a WiFi hub or other coordinator hub device still typically requires professional installation or an advanced technical knowledge by the system user to set up the hub and pair it to other system devices intended to be under the hub's control. Moreover, conventional smart lighting and sound systems only allow the user to control a single device or area at a time, e.g., to turn on or off the front lighting.

Safety and environmental issues are also involved with the use of conventional systems. As to safety, conventional lighting/sound, as well as conventional smart lighting/sound systems operate at high voltages, and are thus inherently less safe. Similarly, such systems are not waterproof, precluding their use outdoors when inclement weather is a risk (and precluding permanent or semi-permanent outdoor installation).

Thus, a need exists for a new generation of lighting and/or sound systems which address these concerns and provide wireless, multi-point, synchronizable and scalable control to their users.

BRIEF SUMMARY OF THE INVENTION

Accordingly, a flat, wireless, broadcast, multi-point, synchronizable and scalable lighting/sound control system is provided which allows the user quick and easy setup and use. This easy-to-use system also addresses the aforementioned safety and environmental issues, such as avoidance of high voltage and water hazard concerns. The system uses a hop topology with a synchronizable mesh wireless network which allows for seamless synchronization, on/off control of system lighting components, and pinpoint user control to separate or segregate the manner of use of distinct lights or lighting units.

Thus, for example, each individual light or light station or strip can be set to use a music audio signal input, run a predefined light show, operate as a group, or only operate as a specific group channel ignoring all (or certain) commands. A user can control a specific area, synchronize all lights to party music, or change the mood lighting color of an entire room or several rooms to a specific color, all while the system operates using low-voltage direct current (DC) and requires no professional installation and minimal user expertise. Further, by using rotary switch channel segregation, the system provides for music to light coordination not offered by conventional systems. The system may be operated with a mobile application (app) such as may be operated using a smart phone, e.g., to automatically find and operate the control system for immediate use. For example, the system may use a wireless, short-range radio link unit (such as a smart Bluetooth™ Low Energy 4.0+, Bluetooth Sig, Inc., hereinafter "Bluetooth"), in which the application software scans for the system devices and connects automatically to the closest device that it finds within a defined time window.

Thus, the control system as disclosed herein includes an electronic circuit having a wireless mesh radio, a microcontroller, a wireless short-range radio link unit (e.g., Bluetooth), a plurality of field-effect transistor (FET) drivers to connect to LED lights or light strips, a DC (e.g., buck regulator) power supply, an audio input rectifier and filter, and a rotary or other switch.

In another aspect, the invention provides a light and/or sound system which includes a plurality of control systems preferably such as those described above, wherein the light and/or sound system is configured so that the plurality of control systems are interconnected in a non-hierarchical mesh network, wherein the mesh wireless radio of a given unit has the capacity to signal nearby units, one or more units have a rotary switch filter configured to permit hop signal rebroadcasting, and a plurality of light or sound-producing devices (e.g., light-emitting diodes) are functionally connected to the plurality of FET drivers.

In yet a further aspect, the light and sound system includes a smart phone application or music signaling unit which is configured to provide for variation of system performance parameters, such as synchronization of color and light intensity within area zones within the system's coverage.

The invention also includes a microcontroller software platform including an embedded microcontroller firmware configured to implement flat, wireless, multi-point broadcast hopping communication schemes including device property filtration and device property synchronization. The device types coordinated by the software platform include ones having common properties with the capacity to be modified individually or wirelessly synchronized.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION OF THE INVENTION

Figure 1:
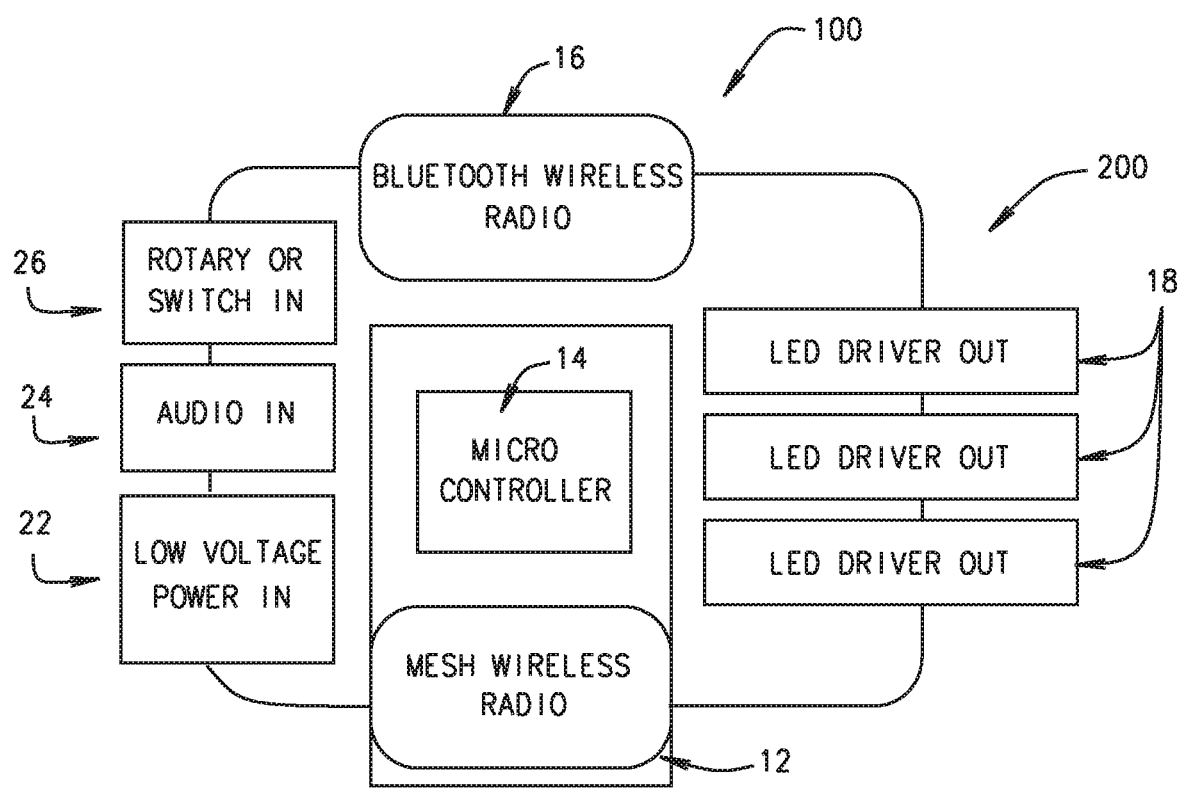
FIG. 1 is a schematic depiction of an exemplary embodiment of the control system of the invention.

The foregoing summary, as well as the following detailed description of certain embodiments will be better understood when read in conjunction with the appended drawings. As used herein, an element or step recited in the singular and proceeded with the word "a" or "an" should be understood as not excluding the plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments as described and shown herein, therefore, provide a flat, wireless broadcast multi-point synchronizable and scalable lighting/sound control system, software platform, and a lighting/sound system which permits quick and easy setup and use. They address safety and environmental issues by permitting low-voltage DC power usage, and simultaneous avoidance of water hazard concerns at such low voltages. In certain embodiments, the system is configured to run on a standard automotive or marine grade battery. For example, a 12 VDC (24 W) wall wart power supply may be utilized to operate a 16 foot 300 foot LED light strip. In another embodiment, the described system can be used to run, e.g., 48 feet of LED lights with a single controller at 66 W potential power output at 12 VDC.

Using the teachings of the instant invention, one skilled in the art can devise alternative embodiments benefitting from low VDC operation providing for safe and waterproof systems which provide the array of lighting and sound system benefits as disclosed herein. As such, various embodiments of the system are provided which are low power, portable, and with light spread across a long or large area. From a safety standpoint, the system may be operated on standard batteries or portable UPS power and can light walk ways or stairs easily, such as on a boat, house, or building, and can be backed up with a very low power low voltage backup, exterior lighting system, or solar panel, for example.

In alternative embodiments, the system of the invention can be adapted to work with a 120 VAC, e.g., or, with the more common 24 VAC in use for many outdoor lighting systems, utilizing a package including a converter box to go from 24 VAC to, e.g., 12 VDC power, as is sufficient for the instant system.

The system's flat, wireless, multi-point mesh broadcasting capacity and rotary or other switches allow for a device "hopping" topology and for seamless segregation and/or synchronization of light and sound to provide an ideal party or mood atmosphere. The system permits the "on/off" master control, via, e.g., a smart phone app, of system lighting and individual components, as well as permitting the user control to separate the manner of use of distinct lights or lighting units.

Accordingly, individual lights or integrated light stations within an area can be set to use a particular music audio signal's input. Similarly, they can be set up to run a predefined light show. They may be programmed to operate as a group, operate dynamically, or only operate as a specific group channel, ignoring all (or certain) commands. Thus, e.g., a user can use the rotary switches attached to particular configured devices to provide station to station control of a specific area, synchronize all lights to party music, or change the mood lighting color or intensity of an entire room or multiple rooms or venues. The system can also be set up to operate seamlessly in moving vehicles such as cars or boats or large outdoor venues, such as for an outdoor concert. The system is operated easily by a consumer—no complicated connectors or hubs to synchronize or pair up, and in a safer, energy efficient manner, due to its ability to make use of a low-voltage direct current (DC) power source. Set up is also greatly improved due to the simplicity of the system.

By using rotary switch channel connection and segregation, the system provides for a seamless music to light coordination not offered by conventional systems. The system may be operated with a mobile software application (app) such as may be operated using a smart phone, e.g., to automatically find and operate the lighting/sound control system for immediate use.

The zone or group can be a software variable switch that can, e.g., be set and stored using, in one embodiment, a regular momentary switch unit rather than a hardware-based rotary switch position. This regular push button switch can physically replace the rotary switch, and include software programmed with the capacity to track the counts/state, and "remember" the after power cycle.

Figure 2:
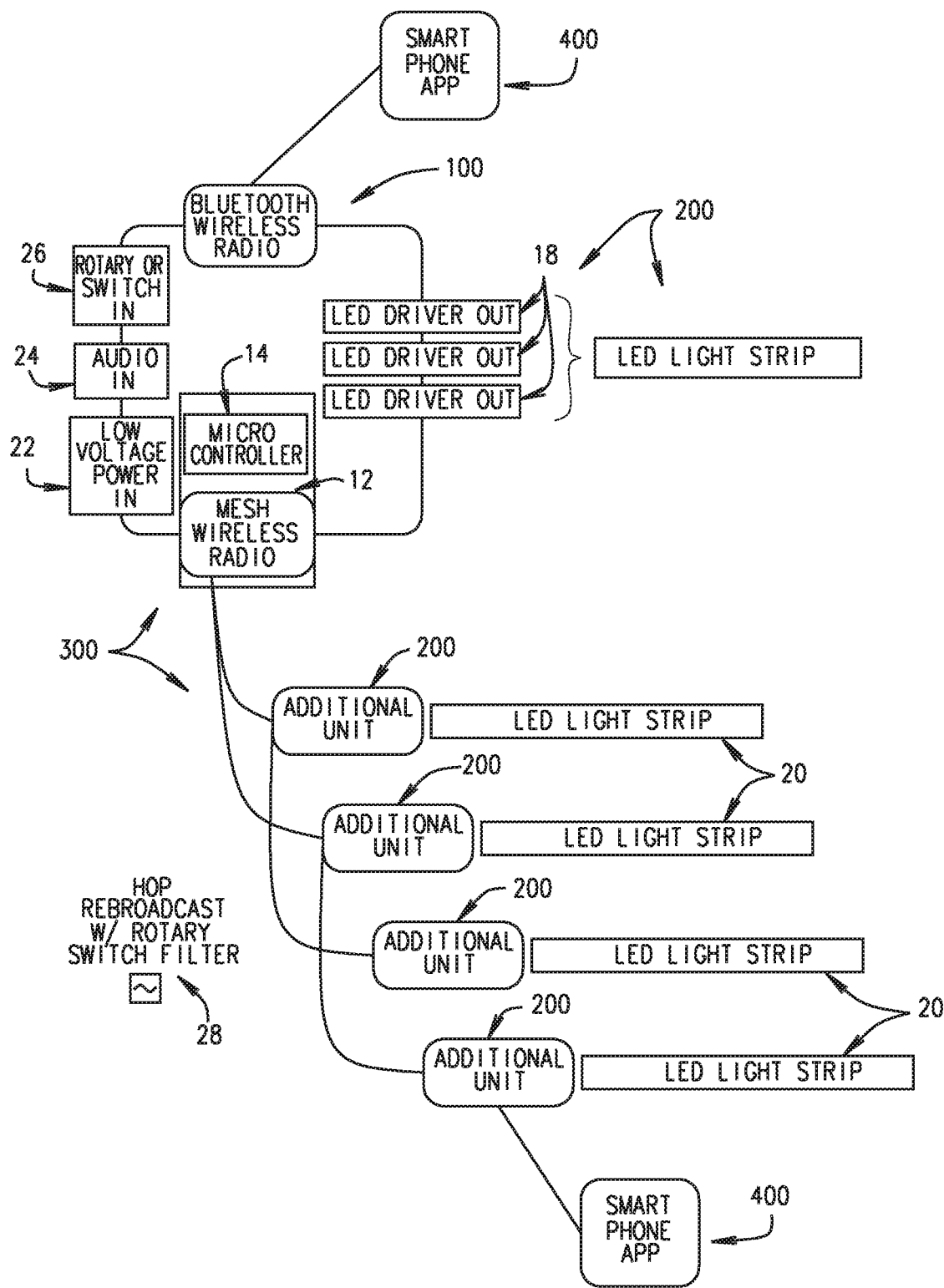
FIG. 2 is a schematic of an exemplary embodiment of the invention wherein a synchronizable and scalable lighting system is shown, including the control system exemplified in FIG. 1.

Referring to the drawings, in one embodiment of the invention, the control system 100 for a lighting and/or sound unit system 200 may be seen in FIG. 1 and as a component of the lighting and/or sound system 200 in FIG. 2. The control system as disclosed herein comprises an electronic circuit, such as a printed circuit board having a wireless mesh radio 12, a microcontroller 14, a wireless short-range radio link unit (e.g., Bluetooth™) 16, a plurality of field-effect transistor (FET) drivers 18 to connect to LED lights or light strips 20, a power supply (e.g., a buck regulator) 22, which feeds low voltage direct current (DC) power, an audio input rectifier and filter 24, and a rotary or other switch 26.

As depicted, the control system 100, an embodiment of which is depicted in FIG. 1, operates a light and/or sound system 300 (see embodiment schematically depicted in FIG. 2) which includes a plurality of light or sound units 200 (here depicted as LED light strips) having the control systems 100 as described above. In this embodiment, the light and sound system 300 is configured so that the plurality of units 200 with the inventive control system 100 are interconnected in a non-hierarchical mesh network, wherein the mesh wireless radio 12 of a given unit 200 has the capacity to send radio signals to nearby units, and one or more, or even, all, units 200 have a rotary switch filter 28 configured to, e.g., permit hop signal rebroadcasting. The units 200, in this embodiment, include a plurality of LED light strips 20 which are functionally connected to the plurality of FET drivers 18. The system's range is essentially unlimited, since the number of "hops" that a system can utilize is simply a software variable. In one embodiment, a device unit may have a 400 foot range, and the system is defaulted to 1200 feet, which utilizes 3 device hops to cover the system's area of operation.

In many preferred applications, such as the embodiment depicted in FIG. 2, the light and sound system 300 can be managed by one or more smart phone apps 400 or other music signaling units, e.g., such as where it is configured to provide for area synchronization of color and light intensity within the system.

The invention also includes a microcontroller 14 software platform including an embedded microcontroller firmware program configured to implement flat, wireless, multi-point broadcast hopping communication schemes including device property filtration and device property synchronization.

The microcontroller provides support for hopping and, e.g., 2.4 GHz FCC functions. Hardware/software components for a gateway, hub or coordinator unit are not required, and hence a simple, inexpensive mesh network is provided where the network device components readily communicate one to the other. Thus, additionally, unique device IDs are optional at the stack level, and pairing of devices is not required, as the network is a flat one. However, despite the simplicity of the microcontroller platform, the system can provide, in certain embodiments, for a hardware abstraction layer and callback function capability. Moreover, in additional embodiments, "transmit retry" functionality is built in to make the system more reliable.

As an illustration of use of a particular embodiment, the user simply executes a button, switch or other signaling mechanism dedicated to "turn lights on", and if the device in question has a "light" property, it turns on. Similarly, the user may provide the signal or command for "turn lights to X color", and if the device in question is capable of color activation, it goes to the X color. Coordinated lighting schemes are readily produced, e.g., RGB hex formats, blended whites, and synchronized dimming are lighting techniques known to those skilled in this art.

The device types coordinated by the software platform include ones having common properties with the capacity to be modified individually or wirelessly synchronized. The system software can act as a bridge from Bluetooth™, e.g., to the mesh network. In particular embodiments, a rotary switch is used to determine the "receive state" of the local device. However, in such embodiments of the invention, the device can be configured to pass messages out onto the mesh from an App over Bluetooth™ regardless of its rotary receive mode setting. For example, a user can be sitting on his back deck (with back deck lights set on a "channel 2" rotary), yet he may want to turn on the porch lights (in this example, on rotary channel 3). He is, in this embodiment, despite the difference in channels, connected to the porch lights as follows: he is connected to the unit on the back porch over Bluetooth™, because he is on the back deck. The deck unit takes the "message" and sends it along; it hops around on the mesh until it gets to the porch unit (on channel 3). Thus, the steps of traversing a traditional hierarchical mesh to a gateway (or even to the cloud, via Internet) to decide what type of device it is, what it is paired to, and then having the signal message redirected to the porch unit, are all avoided. Accordingly, in these embodiments of the invention, this circuitous routing with its many chances for a wireless "handshake" message to fail, are precluded, making the system more reliable, simpler, faster, and less expensive.

It is to be understood that the above description is intended to be illustrative, and not restrictive. For example, the above-described embodiments and aspects thereof may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. Include if relevant: In the appended claims, the terms "including" and "in which" are used as the plain-English equivalents of the respective terms "comprising" and "wherein."

This written description uses examples to disclose various embodiments of the invention, and to enable any person skilled in the art to practice the various embodiments of the invention, including making and using any devices or systems and performing any incorporated methods. The patentable scope of the various embodiments of the invention may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

The invention claimed is:

1. A control system comprising:
   a microcontroller;
   a low voltage power supply;
   an audio input rectifier and filter;
   a rotary or other switch;
   an electronic circuit having a wireless mesh radio;
   a wireless short-range radio link unit distinct from said wireless mesh radio, said wireless short-range radio link unit configured to receive a control message;
   a plurality of field-effect transistor drivers configured to connect to at least one individual light or sound producing device or set of said devices, each of said plurality of field-effect transistor drivers is individually configurable to connect to and continuously synchronize a unique set of light or sound producing devices from information transmitted through a non-hierarchical mesh network;
   wherein said control system can be configured to wirelessly sync with similar control systems through said wireless mesh radio within a predetermined proximity in a non-hierarchical mesh network configuration, such that said network configuration can expand as similar control systems are introduced to said network;
   wherein said control system can be individually configured to pair with and continuously synchronized with a first group of control systems on said non-hierarchical network, and can be further individually configured so as to remain unpaired with a second group of control systems on said non-hierarchical network, such that said control system is in continuous synchronization with said first group, but not in continuous synchronization with said second group;
   wherein said control system can rebroadcast said control message to said similar control systems on said non-hierarchical mesh network via said wireless mesh radio regardless of the group.

2. The control system of claim 1 wherein the rotary or other switch is a rotary switch.

3. The control system of claim 1 wherein the rotary or other switch is a push button switch.

4. A light or sound system comprising:
   a plurality of control systems, wherein the plurality of control systems are interconnected in a non-hierarchical mesh network;
   wherein each of said plurality of control systems comprises:
      a mesh wireless radio that has the capacity to signal the mesh wireless radio of nearby control systems;

a switch filter configured to permit hop signal rebroadcasting;

a plurality of field-effect transistor drivers configured to connect to at least one individual light or sound producing device or set of said devices, each of said plurality of field-effect transistor drivers is individually configurable to connect to and continuously synchronize a unique set of light or sound producing devices from information transmitted through a non-hierarchical mesh network;

wherein said plurality of control systems can be configured to wirelessly sync together through said wireless mesh radio, such that said light or sound system can expand as additional control systems are introduced to said network;

wherein each of said plurality of control systems can be individually configured to pair with and continuously synchronized with a first group of control systems in said light or sound system, and can be further individually configured so as to remain unpaired with a second group of control systems in said light or sound system, such that a given control system is in continuous synchronization with said first group, but not in continuous synchronization with said second group;

wherein each of said plurality of control systems can rebroadcast a control message to other control systems in said light or sound system through said non-hierarchical mesh network regardless of the group.

5. A light or sound system as set forth in claim 4, wherein;

each of said plurality of control systems further comprises:

an electronic circuit having a wireless mesh radio;

a microcontroller;

a wireless short-range radio link unit;

a low voltage power supply;

an audio input rectifier and filter; and a rotary or other switch.

6. A light or sound system as set forth in claim 5 further comprising a smart phone having a software application or other music signaling unit which is configured to provide for area synchronization of color and light intensity within the system by wirelessly functionally connecting to one or more of the wireless short-range radio link units.

* * * * *